INVENTOR.
SANFORD C. LYONS
BY
Morse, Altman & Oates
ATTORNEYS

INVENTOR.
SANFORD C. LYONS
BY Morse, Altman & Oates
ATTORNEYS

Sept. 15, 1970          S. C. LYONS          3,528,769

METHOD OF TREATING SECONDARY KAOLIN

Filed Nov. 15, 1966          4 Sheets-Sheet 4

INVENTOR.
SANFORD C. LYONS
BY
Morse, Altman & Oates
ATTORNEYS

United States Patent Office
3,528,769
Patented Sept. 15, 1970

3,528,769
METHOD OF TREATING SECONDARY KAOLIN
Sanford C. Lyons, Bennington, Vt., assignor to Georgia Kaolin Company, Elizabeth, N.J., a corporation of New Jersey
Continuation-in-part of applications Ser. No. 764,395, Sept. 30, 1958, and Ser. No. 527,151, Feb. 14, 1966. This application Nov. 15, 1966, Ser. No. 594,426
The portion of the term of the patent subsequent to Sept. 15, 1976, has been disclaimed
Int. Cl. C01b 33/26; C04b 33/04
U.S. Cl. 23—110                          6 Claims

ABSTRACT OF THE DISCLOSURE

This invention relates to the discovery of a commercially practicable method of treating Georgia kaolin to obtain a product equalling in measured whiteness imported English clays which have long since been considered by industries, such as the paper-making industry, as establishing a generally accepted standard for superior whiteness, this method comprising essentially: (1) the fractionation of washed kaolin with the recovery of the coarse fraction containing relatively few particles less than 2 microns (equivalent spherical diameter), limit of such fines being a critical 20%, (2) the delamination of a major portion of the coarse particles in said coarse fraction by the removal of at least one surface lamina therefrom to form a substantial number new plate-like fine particles and to expose thereby a substantial number of new surfaces, (3) the fractionation of the delaminated mass with the recovery of a fines fraction containing at least 80% fines, and (4) the recirculation of the coarse fraction from the second fractionation for repeated subjection to the delaminating treatment.

---

Figure 1:
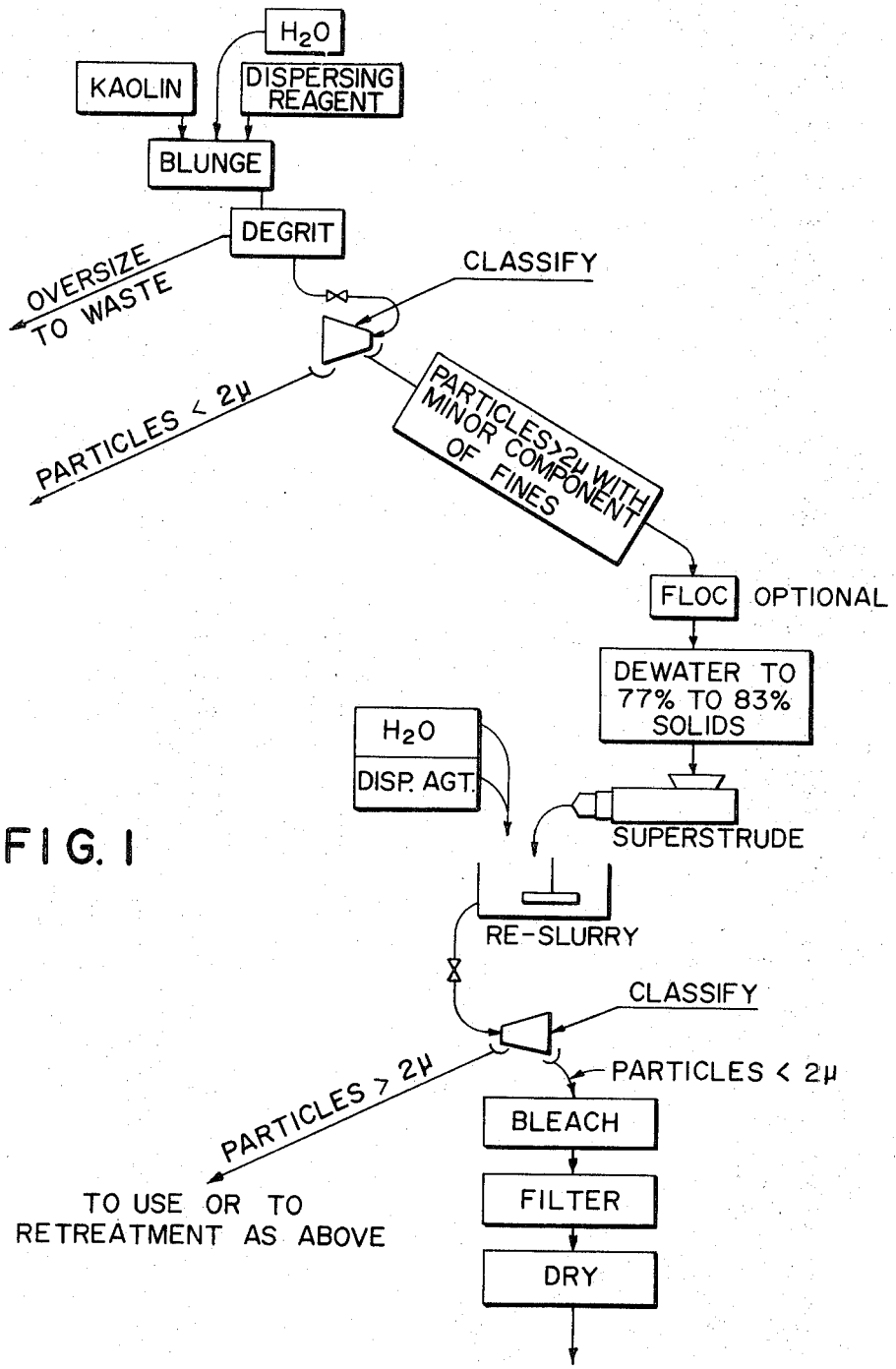

This application is a continuation-in-part of my copending application Ser. No. 764,395, filed Sept. 30, 1958 for Improved Kaolin Product and Process for Making Same, now abandoned, and Ser. No. 527,151, filed Feb. 14, 1966 for Kaolin Product. The invention has to do with processes, including the commercially practicable process described in said applications, for improving the color of secondary kaolin so that its measured whiteness is comparable to that of the best English clays.

PRIMARY AND SECONDARY KAOLINS

Kaolin is the result of weathering of certain minerals such as feldspar over long periods of time. If, as in the case of English kaolins, the clay is found in its original location, it is known as primary or residual kaolin and is usually of superior whiteness, having a "Whiteness Index" in the range of 13.9–9.5, the lower value indicating a whiter product (TAPPI Monograph Series No. 20, page 69.) The Whiteness Index for any sample is the numerical difference between the reflectance values obtained on a General Electric recording spectrophotometer for wave lengths of 700 millimicrons and 400 millimicrons. It is an inverse scale, the Index for a perfect white being zero.

Kaolins which have been washed away from their original location and deposited elsewhere are known as secondary or sedimentary clays. These clays have usually been superficially stained in the process of relocation and are off-color, having usually a Whiteness Index in the range of 20–16.1 in the case of American clays currently used for paper-making purposes.

The superior whiteness of English clays has for many years resulted in the adoption of their range of Whiteness Index as a standard for whiteness which is commercially acceptable for uses where a very high degree of whiteness is desirable, such as coating for paper.

The kaolins found in Georgia, U.S.A., are secondary clays which are off-color by comparison with these English clays. The color can be improved to some extent by chemical bleaching treatment but not enough to give them a Whiteness Index within the range of English clays.

English clays are also characterized by a high degree of brightness which is not the same as whiteness. Brightness depends to a considerable degree on the fineness of the particles of a kaolin. Brightness is numerically expressed as the percentage of the reflectance of a sample at a wavelength of 457 millimicrons measured on a spectrophotometer as compared with that of pure magnesium oxide as a standard.

DISCOVERY OF THE PRACTICAL SIGNIFICANCE OF THE FINES FRACTION

Kaolin has been mined and put to various uses for a long time but it was not until the early thirties that an epoch-making discovery was made by William T. Maloney and described in U.S. Pat. No. 2,158,987. This discovery that kaolinitic particles under two microns (equivalent spherical diameter) differed from larger kaolinitic particles in physical properties other than size was explained some fifteen years later when the electron microscope revealed that in general kaolinitic particles greater than two microns, e.s.d., are in the form of "stacks" of hexagonal plates which cohere very strongly so that very substantial forces are required to separate them. Maloney's discovery led to the development of a huge field of employment of kaolin, namely, as a coating pigment for paper, such coating material being the "fines," i.e. kaolin particles two microns or less in size (equivalent spherical diameter). The resulting tremendous demand for fines caused a new by-product disposal problem for kaolin producers since the fines fraction constitutes only a portion of any crude kaolinitic clay. In the case of Georgia kaolin the fines fraction represents only about 60% of the whole, as a general rule. Most other kaolins in the world have an even smaller percentage of fines.

Since there was relatively little industrial use for the coarse fraction (greater than two microns, e.s.d.) it was inevitable that widespread efforts would be made to disintegrate these larger particles into smaller sizes so as to make them acceptable for use as coatings, etc., and probably every known device for grinding was tried for this purpose. For example, Maloney in his Pat. No. 2,158,987 suggested using a ball-mill for this purpose but this proved to be so inefficient that its use for that purpose was abandoned.

EFFORTS TO INCREASE PERCENTAGE OF FINES

Among those who sought to solve the problem of finding a commercially practicable method of reducing the particle size of coarse kaolin was Brown (U.S. Pat. No. 2,305,404) who in an attempt to produce a "classified clay," like that of Maloney, repeatedly passed damp kaolin crude, or a coarse fraction thereof, between spring-loaded crusher rolls (see page 1, col. 1, lines 45–49, and page 2, col. 1, lines 6–16). This method of treating kaolin was used long before Brown as a preliminary step in the blunging operation to reduce crude clay to a slurry. As a method of reducing particle size it has never been commercially used, as far as is known.

Rafton (U.S. No. 2,448,049) offered a "buzz saw" type wet-impact mill for grinding clays but, as far as is known, no commercial installation for the practice of this method was ever made.

Millman et al. (U.S. No. 2,535,647) offered a kneading process employing a pugmill or similar device to "improve the processing quality of clays" by breaking kaolinite crystals crosswise of their flat side, as explained in "Viscosity Control of Concentrated Clay Suspensions," N. Millman, Paper Trade Journal, 1951, pages 28–32.

Asdell (U.S. No. 2,726,813) disclosed a method for clay comminution consisting of entraining clay particles in high velocity gaseous streams and causing the particles to collide (col. 2, lines 54–57).

Billue (British No. 876,668 and U.S. No. 3,058,671) took the Rafton mill and ground coarse clay containing less than 50% or less than 35% of fines to obtain a "fractured-by-milling" product which was "brighter" than the unground natural material, as was to be expected, because the finer fractions of a kaolin were known to be brighter (TAPPI Monograph 20, page 75, Table IV) than the coarser fraction from the same clay. But, again, so far as known to this applicant—no successful commercial application of this method has been made.

Meanwhile Lyons (U.S. No. 2,904,267) disclosed a new and more efficient method of delaminating the coarse particles in clay by "superstrusion", i.e. extruding washed kaolin having a moisture content of 17% to 23% through holes in a die plate small enough to require a pressure of at least 350 p.s.i. to force the clay through. As explained in that patent, the different rates of flow in the clay passing through each hole, from a minimum rate at the edge of the hole to a maximum rate at the center of the hole cause the particles to rub against one another under high pressure with the result that delamination of many such particles occurs. This process is now in successful commercial use on a large scale.

In order to clarify the true significance and novel nature of delamination of kaolin stacks, it may be well to point out that there had been a few erroneous reports of "exfoliating of large kaolin crystals" which appeared in the technical literature about 75 years ago. This was prior to the invention of teh electron microscope which first permitted valid understanding of the shape of the kaolin particles. For example, in a report by the mineralogist, Mr. A. B. Dick, which appeared in "Min. Mag.," vol. 8, p. 15 in 1889 (later, invalidly cited in reference to kaolin by J. W. Mellor in his "Comp. Treat. on Inorg. & Theoret. Chem.," 1925) he described optical microscopic studies of a mineral which he thought to be kaolin, but which was later shown by Ross and Kerr to have actually been a different mineral which they named "Dickite."

PRODUCT OF SUPERIOR MEASURED WHITENESS DERIVED FROM STAINED CLAY

On Sept. 30, 1958 Lyons further disclosed that if most of the fines are removed from washed kaolin before it is "superstruded," a residuum of as much as 20% fines being permissible, a product of surprising measured whiteness as well as brightness is obtained. If then the superstruded product is classified to recover the fines fraction, the recovered fraction being at least 80% fines, the resultant product is found to have a Whiteness Index within the range of whiteness of the English clays, i.e., 13.9–9.5 (TAPPI Monograph No. 20, page 69). The 20% tolerance of fines in the starting material is a critical figure since any larger percentage of original fines (which in secondary clays are stained) will result in a product of lesser whiteness than required to come within the recognized range of whiteness of English clays. If the classification of the superstruded material is more thorough so that the recovered fines fraction contains 95% fines, and if this fraction is subjected to a customary chemical bleaching treatment, the Whiteness Index of the product is equal to the best figure that can be obtained from commercial English clay.

Subsequent to the discovery of the efficacy of superstrusion in delaminating kaolin stacks, a different method of delaminating stacks was disclosed by Gunn and Morris in U.S. Pat. No. 3,171,718, namely, by rapid agitation of an equeous slurry of the clay with fine, non-abrasive media such as nylon pellets. These patentees maintain that their method of delaminating coarse particles of kaolin results in a product which has a "blue-white color comparable with that of imported English clays" and a G.E. brightness of at least 90.

NATURE OF KAOLINITE PARTICLES

To understand the increase in whiteness of secondary kaolinite when subjected to a delaminating process, some knowledge of the nature of clay particles is necessary. Kaolin is more or less unique among minerals in that its particles occur in two generic shapes and, further, a demarcation of occurrence in nature between these two shapes occurs at a fairly definite particle size, namely, at about 2 microns, e.s.d. Particles finer than 2 microns are basically hexagonal crystal plates roughly one tenth as thick as they are long, or else thin face-to-face aggregations thereof. Particles larger than 2 microns are stacked aggregations of these plates, usually in a sort of superposed configuration of mosaic sheets of the tiny plates, such particles being usually referred to as "stacks." The exact nature of the mechanism which bonds plates into stacks is not yet understood, but it is extremely strong so that rough treatments such as pumping such stacks in aqueous suspensions through miles of pipe-lines at high speed, passing them through centrifuges and ball-milling them have no perceptible delaminating effect. When plastic shearing forces of sufficient magnitude are applied, the stacks break up into smaller particles having freshly exposed faces which presumably exhibit a pristine whiteness. Since secondary kaolins are almost invariably off-color owing to surficial stains acquired when being collected in mineral-bearing waters in coastal lagoons millions of years ago, the production of fresh white faces on the delaminated particles measurably increases the whiteness of the clay as a whole. A higher degree of whiteness of the resulting product can be had by first removing most of the stained fines in the clay before subjecting the rest of it to a delaminating process. Complete removal of natural fines is too difficult and expensive to be commercially practicable, but a maximum tolerance of 20% of fines is permissible in obtaining a product with a Whiteness Index within the recognized range of the whiteness of English clays.

THEORY OF WHITENESS INCREASE

While the explanation of this increase in whiteness does not seem yet quite clear, it does appear probable that it may be discernible from the fact that the kaolin "stacks" can be visualized as being comparable to "minute loaves of white bread whose crust is brown." When the "end slices" are rubbed or knocked off, they expose four new white faces for each stack. If there are not too many, i.e., less than 20%, natural "brown slices" present, the effective color of the new mixture will be markedly whiter, but if there should be an excessive proportion of natural "brown slices" present, the mass color will not be changed very much.

Experience has shown that, while in American sedimentary kaolins a part of this surfacial stain can be removed by known chemical bleaching methods, the titaniferous portion thereof cannot be practically eliminated by known chemical bleaching methods.

Figure 2:
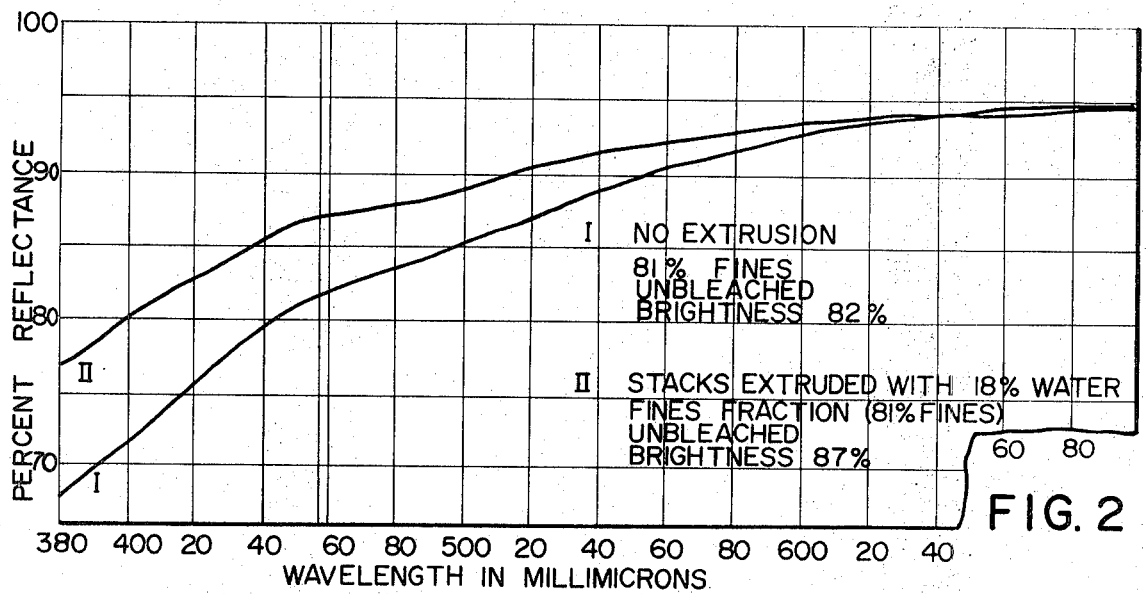
Figure 3:
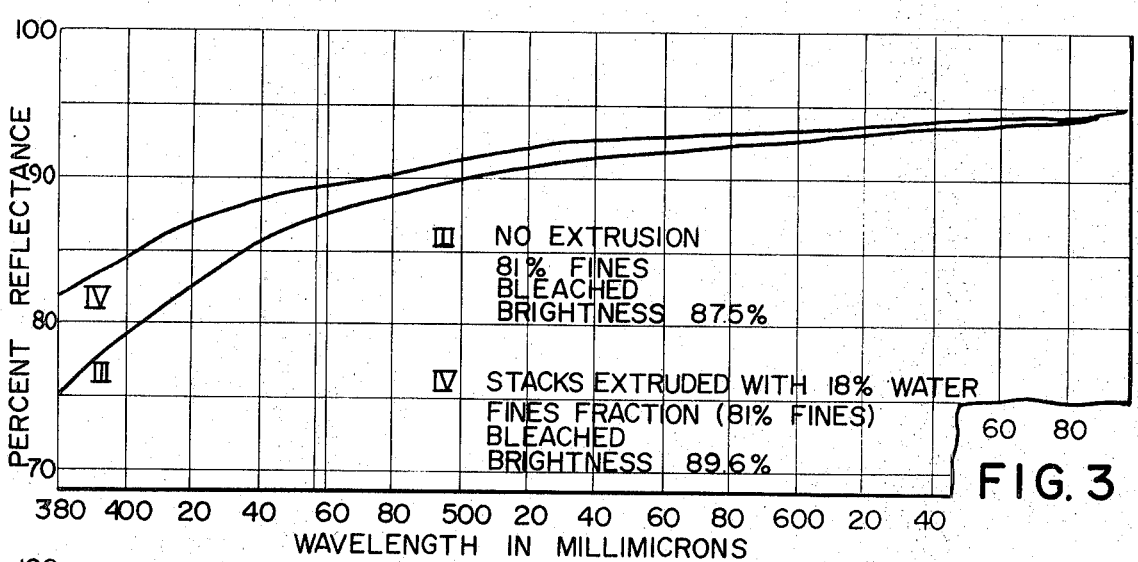
Figure 4:
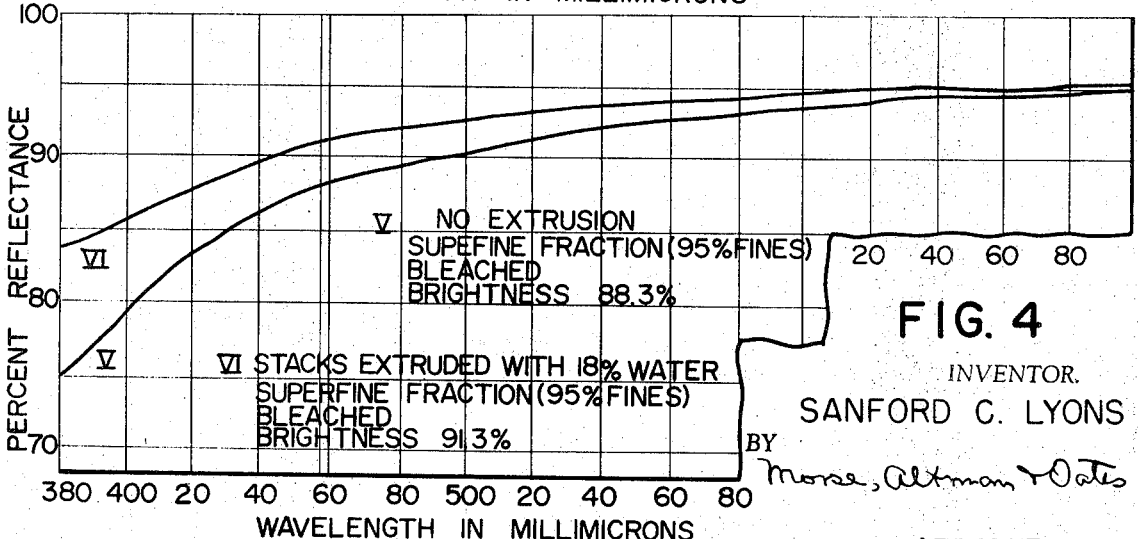
Figure 5:
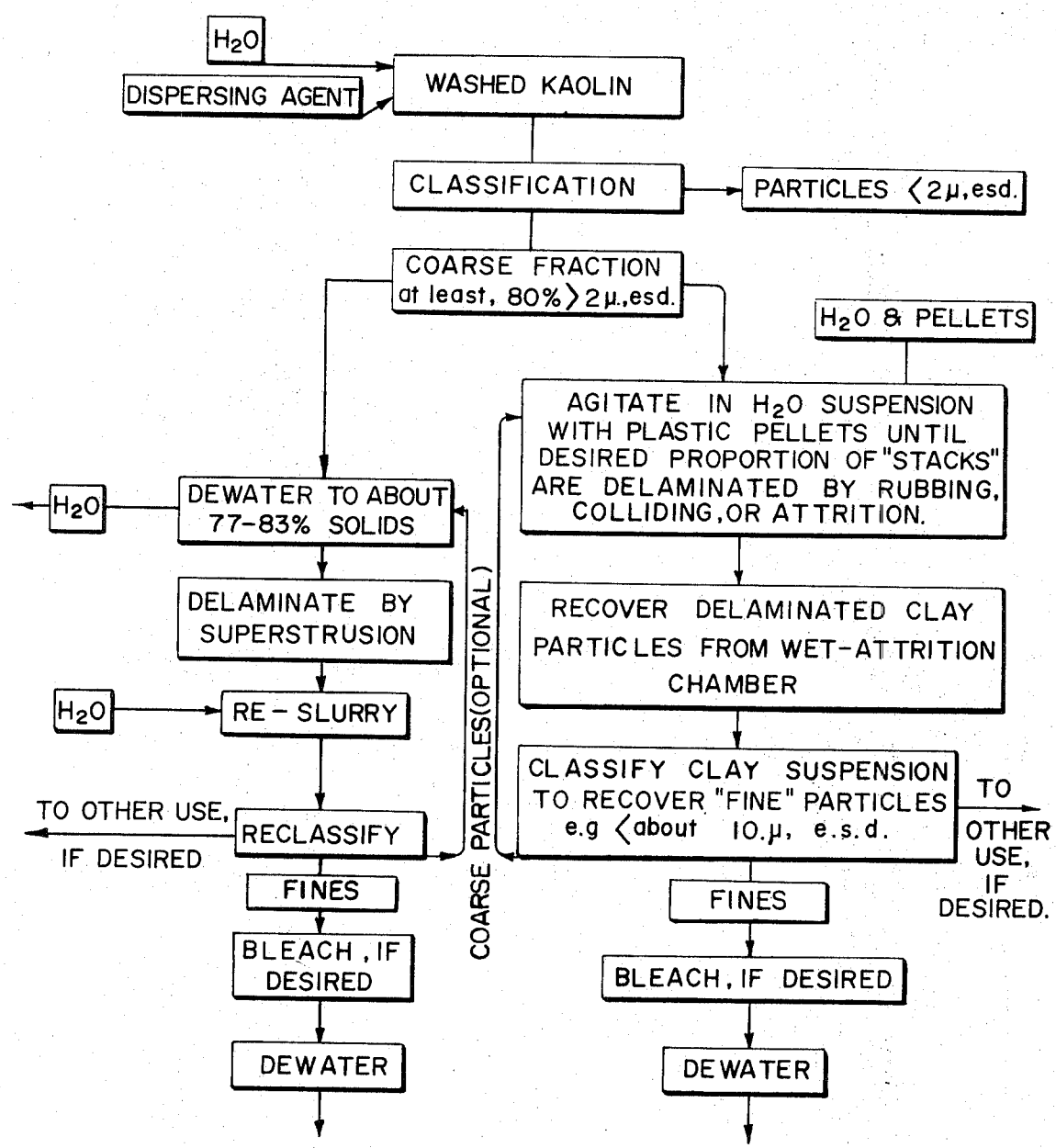
Figure 6:
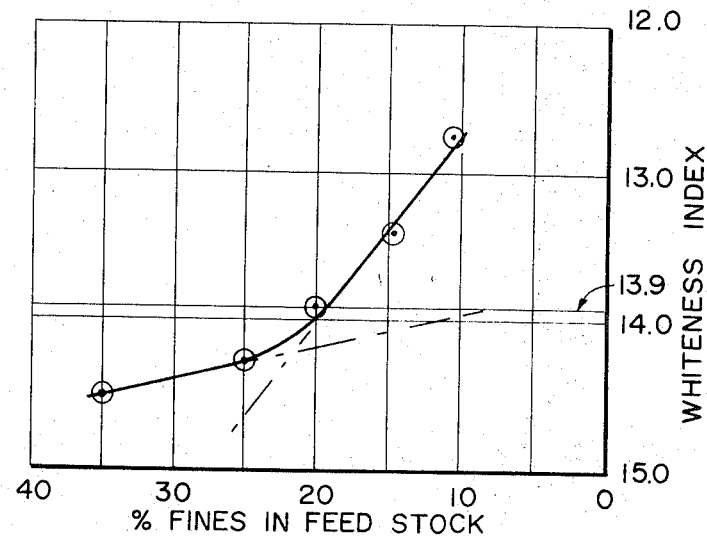
Figure 7:
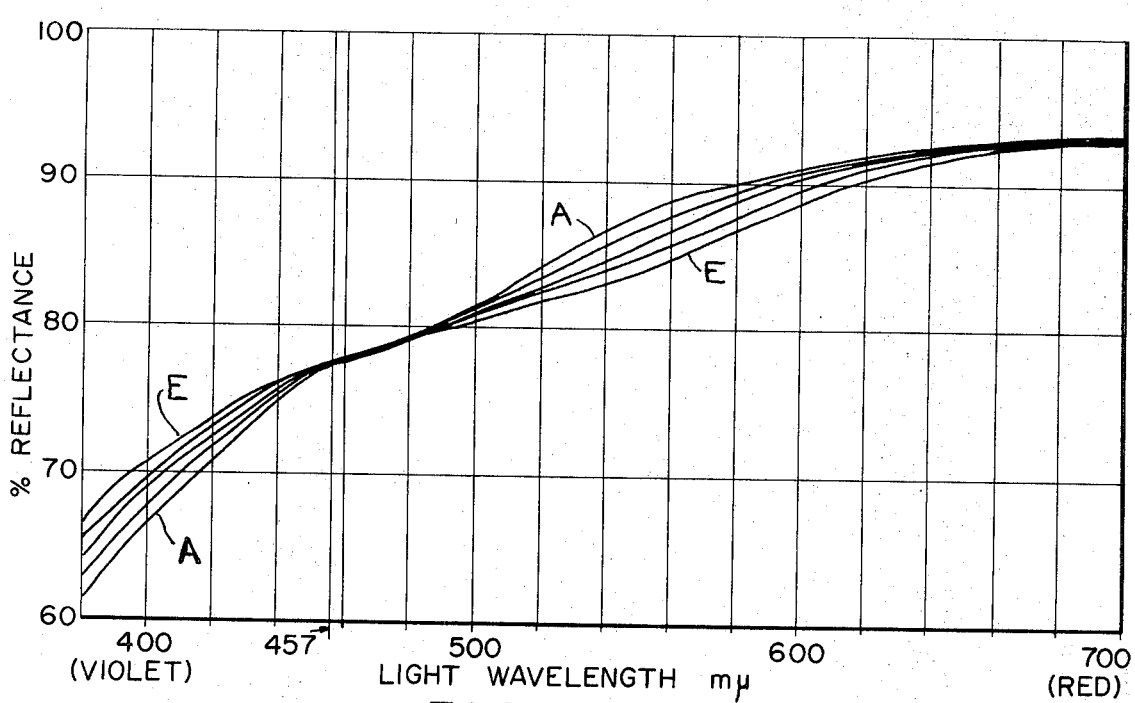

In practicing delaminating processes, ordinary well-known apparatus may be used, such apparatus and experimental results being indicated on the drawings, of which FIG. 1 is a flow diagram indicating a sequence of steps which can be employed in practicing the invention;

FIGS. 2, 3 and 4 are experimental graphs indicating differences of qualities between clays which have been subjected to a deliminating treatment, and clays which have not been so treated;

FIG. 5 includes a flow diagram indicating a sequence of steps for practicing another method of delaminating clay stacks;

FIG. 6 is a graph showing the Whiteness Indices corresponding to various percentages of fines in the starting materials subjected to the same delaminating process; and FIG. 7 is a series of spectrophotometric graphs of red and yellow clays and blends thereof.

DELAMINATING BY "SUPERSTRUSION"

A method of practicing the invention is illustrated in FIG. 1 of the drawing. Crude secondary kaolin is blunged with water and any of the well-known dispersing agents such for example as sodium hexametaphosphate. From the resulting deflocculated slurry foreign and oversize particles are allowed to settle out. The purified slurry is then fractionated to separate most of the fines from the particles greater than 2 microns, e.s.d. The coarse particle fraction may then be treated with a flocculent such as alum. The water content of the slurry is reduced by removal of moisture and/or the addition of dry clay until its solids content is from 77% to 83%, the optimum percentage for any particular batch being determinable by testing, as the behavior of clay, even from the same deposit, cannot be accurately predicted. This clay mass, which is considerably stiffer than ordinary putty and which may have an almost dry appearance but which contains sufficient moisture to be extrudable in a non-crumbly and non-powdery condition through a 3/16" hole by a gauge pressure of about 350 p.s.i. or more, is then extruded through a die having one or more holes which may be from 1/16" to 7/16" in diameter or equivalent non-round cross-section. Such "superstrusion" results in severe plastic shearing forces in the mass which are sufficient to delaminate many of the stacks with a resulting increase in fines of at least 5% even when the feed stock contains 50% of fines as disclosed in my Pat. No. 2,904,267. Much greater percentages of fresh fines are obtainable by the superstrusion process if the feed stock is the coarse fraction of a fractionated, washed kaolin having less than 20% natural fines, as described in my application Ser. No. 764,395.

After a superstrusion operation, water is added to the mass, together with a dispersing agent, if necessary, to facilitate fractionation of the resultant slurry. The fines fraction recovered from this fractionation is found to be materially whiter and brighter than equivalent naturally occurring fines. The whiteness and brightness can be further enhanced by a customary chemical bleaching treatment.

The graphs shown in FIGS. 2, 3 and 4 are spectrophotometric recordings of the reflectance of the products of six experiments. The starting material was taken from a typical coarse fraction from the centrifugal process step in a conventional kaolin mill production stream at Dry Branch, Georgia. This material was further fractionated with a resulting coarse fraction containing about 95% stacks, and a fines fraction containing about 81% fines. A sample of this fines fraction was tested without further treatment (Curve I in FIG. 2). A second fines sample was bleached, then tested (Curve III). A third fines sample was further fractionated to increase the fines content to 95%, then bleached and tested (Curve V) with the following results:

|  | Brightness, percent | Whiteness Index |
| --- | --- | --- |
| (I) (No extrusion) | 82 | 21.7 |
| (III) (No extrusion), bleached | 87.5 | 14.8 |
| (V) (No extrusion), 95% fines, bleached | 88.3 | 14.1 |

Some of the same starting material (95% coarse particles) was superstruded, then fractionated, the resultant fines fraction (containing 81% fines) was then tested (Curve II). The same resultant material was bleached before being tested (Curve IV). A sample of the superstruded material was further classified to recover a fines fraction containing about 95% fines. This was bleached and tested (Curve VI). Following are the results of the tests of the superstruded clay.

|  | Brightness, percent | Whiteness Index |
| --- | --- | --- |
| (II) 81% fines, unbleached | 87 | 13.6 |
| (IV) 81% fines, bleached | 89.6 | 10.4 |
| (VI) 95% fines, bleached | 91.3 | 9.5 |

The Whiteness Index is an inverse scale, the smaller numbers indicating whiter products. The Whiteness Index of all three of the superstruded samples is well within the recognized range of the English clays.

While the numerical range of difference in Whiteness Index between these various specimens may seem small in absolute values, one versed in the art of selling paper-coating clays will know that the critical question of whether his product will be salable is often resolved by the question of whether or not it can meet the degree of whiteness of the competitors product. In the above cited examples, not even the best of the bleached natural specimens would quite equal the poorest of the English whiteness limits, whereas, even the unbleached delaminated specimen was within this range, and the best of the bleached delaminated specimens was equal to the best of the English clays. This is by no means an insignificant difference.

DELAMINATION BY WET ATTRITION

While the process of superstrusion as described in Pat. No. 2,904,267 is an effective and commercially practicable way of treating washed kaolin, there are other ways of reducing the average particle size of the clay by splitting many of the particles greater than 2 microns (e.s.d.). Reference to several such methods has hereinbefore been made, the various patentees noting increases in brightness of the resulting products, little or no notice being taken of any possible improvement in whiteness, much less any measured comparison of the whiteness of the starting material and end product. However, in the Gunn and Morris Pat. No. 3,171,718 mention is made of an observed "distinct blue-white color comparable with that of imported English clays" (col. 24, lines 19–20) but no measurement of such whiteness is reported in the patent, nor is there any mention of the critical tolerance of 20% of fines in the material which is to be submitted to a delaminating treatment if the product is to have a measured Whiteness Index within the range of whiteness of English clays.

The wet attrition process described in the Gunn and Morris patent comprises the use of a large number of nylon pellets which are vigorously agitated with a slurry of a coarse fraction of Georgia clay for periods of several hours. Collision of the clay stacks with the nylon pellets and with one another result in the splitting of many of the stacks and an increase in the fines present. A comparison of the products resulting from the superstrusion process and the wet attrition process is given in the following table.

TABLE I.—COMPARISON OF WHITENESS AND BRIGHTNESS KAOLINS DELAMINATED BY SUPERSTRUSION vs. WET-ATTRITION EFFECT OF PERCENT OF FINES IN FEED-STOCK

| Percent natural fines in feedstock | Brightness (bleached) | | Whiteness index (bleached) | |
|---|---|---|---|---|
| | Extruded | Wet attrition | Extruded | Wet attrition |
| 10.5 | 90.0 | 89.1 | 12.2 | 12.8 |
| 15 | 89.9 | 88.6 | 12.5 | 13.4 |
| 20 | 89.0 | 88.9 | 13.0 | 13.9 |
| 25 | 88.3 | 88.2 | 14.5 | 14.3 |
| 35 | 87.5 | 88.1 | 15.1 | 14.5 |

Note.—The extruded specimens were all moistened to 18% $H_2O$ and extruded twice thru a die-plate with apertures 1/8" diameter.

The wet-attrition specimens were all subjected to wet-attrition in an aqueous suspension with nylon pellets 1/16" diameter x 1/8" length for 90 minutes.

Note.—After their respective delamination treatments, the specimens were all reclassified so as to contain about 86% fines.

It is seen that the delaminated products from both the superstrusion and the wet-attrition treaments—when their respective feed-stock contained less than 20% of natural fines—yielded products which, when classified to about 86% fines and bleached, gave Whiteness Index values within the range for English clays.

RECIRCULATION OF THE COARSE FRACTION

My new process is designed to be operable within the limits of commercial practicability and, while not restricted to those limits, is described in terms and values which I have found to be economically feasible when processing a material which, like kaolin for paper-coating, sells for prices ranging from about 1½¢ to 3¢ per pound in U.S.A., at present.

Thus, while it would probably be physically possible to delaminate completely a specimen of kaolin stacks to a fineness of, say, 90% fines by mere repeated superstrusion or by prolonged wet-attrition delamination, without using any intervening step of classification in order to segregate the delaminated fines from the first stage, or stages, of delamination, it has been found to be more economical to carry the delamination in the first stage of treatment only part way to completion, e.g. 25%–35% of new fines, and then reclassify the treated material and return the undelaminated residue to the superstruders or to the fine-media mill for further treatment adding at this time fresh starting material as a matter of production to maintain more uniform delaminating conditions. It appears that some of the component platelets are less strongly attached to their stacks than others. Mill experience has shown that the product of the first "peel" (delamination step) results in a higher percentage recovery of new delaminated platelets than subsequent delaminations. For this reason and to obviate cyclical variations in delamination efficiency it is normal production practice to introduce into the undelaminated residuum new natural stacks roughly in proportion to the amount of the delaminated product recovered.

Experience has shown that, in the case of superstrusion, as soon as new fine platelets have been produced to the extent of, say, about 30%, they begin to act like "shoe-horns" and seem to "lubricate" the passage of the coarser stacks thru the die-apertures in such a way as to markedly reduce the rate of delamination of these stacks. Similarly, it has been found that, after a substantial proportion of the "stacks" have been delaminated by the action of the nylon pellets, the new platelets thus formed, tend to reduce the effectiveness of the action of the pellets upon the remaining "stacks." For this reason, it is preferable to operate the apparatus in such a way that the feed slip is progressively fed to the delaminator and, simultaneously, withdrawn and classified so that the unsplit residue of "stacks" can be continuously recycled to the delaminator, or applied to other purposes, as the fines produced are separately recovered.

Although these two processes, i.e., superstrusion and intense agitation with nylon pellets, for mechanically delaminating kaolins are markedly different in their scheme and in their action upon the kaolin, they do exert one effect thereon which is surprisingly comparable, and that is that, from a kaolin feed-stock containing not more than 20% of natural fines, they will both produce delaminated clay products which—after classification into the appropriate particle size range (80% or more fines)—will be within the range of measured whiteness to equal that of English clays.

The whiteness improvement which is attained by the wet-attrition mechanical method for delamination of kaolins is fairly comparable to that which is achieved by my superstrusion method. Also, both methods produce kaolin platelets which are wider and of greater diameter-to-thickness ratio than are normally found in natural coating clays. However, it is not true that the general shape and/or physical properties of these products are exactly alike.

PROPERTIES OF SUPERSTRUSION AND WET ATTRITION PRODUCTS

It was noted very early in my tests that the wet-attrition delaminated kaolins were very much more viscous than were comparable kaolins prepared by superstrusion, particularly when the feed-stocks and/or the resulting products therefrom contained only small proportions of natural fines. Stereo-electron micrographs revealed the fact that the wet-attrition delaminated particles were often "feathered-out" at the edges and many of their component laminae were actually folded back, without breaking, by different extents up to 180°. Clearly, these projecting elements provided an infinite number of additional opportunities for inter-particle collisions and shear-blockage when such clays were made into high-solids concentration slurries. Particularly is this true when the viscosity is measured at high-shear conditions, as by the Hercules viscometer. In Table II below, two of these clays of similar particle-fineness are compared as to their significant physical properties.

TABLE II.—PROPERTIES OF FINES FRACTIONS (80% FINES) RECOVERED FROM FEED STOCKS, CONTAINING 10% OR 35% NATURAL FINES AND DELAMINATED BY BY SUPERSTRUSION OR WET ATTRITION (NYLON)

| | Superstrusion fines in feed stock | | Wet attrition fines in feed stock | |
|---|---|---|---|---|
| | 35% | 10% | 35% | 10% |
| Brightness | 87.5 | 89.8 | 87.0 | 89.4 |
| Whiteness Index | 14.8 | 11.1 | 15.5 | 11.4 |
| | Solids Content[1] | | | |
| Viscosity | 68% | 65% | 68% | 65% |
| Brookfield, cpe | 300 | 250 | 400 | 350 |
| Hercules tangent [2] | 4.89 | .555 | 1.67 | .322 |

[1] Clay viscosity is customarily measured at the highest practical percent-solid content. The fact that the products from the 35% natural "fines" content could be measured at 68% whereas those from the 10% feed-stock could be measured only at 65% solids shows the lower viscosity imparted by the presence of the higher content of "blocky" natural fines.
[2] "Hercules tangent" is an index of "high-shear" viscosity—see TAPPI Monograph #30, page 115 (1966). It is an inverse index, and its higher values denote a lower viscosity, which shows that the superstruded products have a lower viscosity than do the wet-attrition products, mainly due to the "feathered-out" edges of the attrition products.

From these data, it is clearly evident that, aside from the markedly increased viscosity contributed to the delaminated product by the wet-attrition treatment as compared to that from the superstrusion, their brightness and whiteness are remarkably comparable.

The data in Table II confirm the earlier data in application No. 764,395 and show that when the feed-stocks to the delamination processes contain less than about 20% of natural "fines," delaminated products from either superstrusion or wet-attrition can be obtained which are well within the whiteness and brightness range of English clays, but that when the residue of natural "fines" is 35%, stated as being acceptable by Billue, U.S. No. 3,058,671, and Gunn and Morris, U.S. No. 3,171,718, the Whiteness Index obtained is poorer than that of any of the English coating clays cited in the TAPPI Monograph.

EFFECT OF FINES IN STARTING MATERIAL

In FIG. 6 is a graph in which the Whiteness Index values of an incremental series of processed delaminated kaolin products are plotted as inverse ordinates against the percentage content of natural fines present in their corresponding feed-stocks, prior to their delamination by means of the nylon wet-attrition step.

This series of feed-stocks, all prepared from the same lot of kaolin, such as would be used in commercial coating clay production, was hydraulically reclassified so that one fraction contained 10.5% finer than 2 microns, e.s.d., another contained 15%, another 20%, another 25%, and another 35% of these natural fines.

All of the feed-stocks were then subjected to the nylon wet-attrition treatment as above described.

Their resulting products, after the nylon pellets had been screened out, were classified so as to recover the fines fraction, slightly more than 80%. This fraction was bleached by standard $Na_2S_2O_4$ treatment, filtered, dried, pulverized and color-measured by means of the G.E. Recording Spectrophotometer.

The figures for Brightness and Whiteness Index are given in Table I, above, and are plotted to form the graph in FIG. 6. This graph is particularly significant in two respects, in that it is seen that, first, only those delaminated products which were made from feed-stocks containing 20%, or less, of natural fines, showed a Whiteness Index of 13.9, or less, which is within the range for English clays; second, there is an inflexion-point, or sharp change in rate of improvement in whiteness with those feedstocks containing 20%, or less, of the natural "fines."

This demarcates a change in kind—rather than a change in degree—because, at this point, the products first enter the Whiteness Index range of the English clays, and it also shows that a hitherto unsuspected mechanism is involved at about the 20% residue content because, as indicated by the broken-line extension of the lower part of the curve, it would otherwise be necessary to reduce the content of fines to 10% before attaining the English range of whiteness.

It will thus be seen from the above cited tests, using widely differing mechanical schemes, that when one delaminates, or splits apart the component crystallites or laminae which compose the kaolinite "stacks" by mechanical means which employ elements of strong plastic shearing or frictional rubbing, either against another solid member or against the particles themselves, a novel kaolin product is obtained which is characterized by a hitherto unknown high ratio of diameter to thickness of particles and a measured Whiteness Index which is equal to that of the English clays, if all, or nearly all, of the natural fines are removed before the delamination.

While I have shown that this process is successful when using methods as different from each other as superstrusion is from wet-attrition, the method is of even wider application than these. For example, kollergangs, pelletmills, smooth differential confronting-rolls, etc. can be used with slightly lower efficiency, if the above-disclosed principles are observed.

WHITENESS DIFFERS FROM BRIGHTNESS

As is explained more fully below, in connection with FIG. 7, the terms "whiteness" and "brightness" are often used in a confused sense of equivalency, and reference to the accepted standard index of "brightness," i.e. the percent reflectance of wavelength 457 millimicrons is sometimes made as if it necessarily connoted, also, a similar degree of "whiteness."

So far as known to me, the demarcation of whiteness improvements of kaolin products in quantitative terms of measured "Whiteness Index" was first disclosed in my copending application No. 764,395 and, in fact, it still is the only such reference in the published prior art as far as I have been able to ascertain.

The scientific and industrial significance of this fact is, perhaps, best stated in the following words, attributed to the eminent British scientist, Lord Kelvin, "I often say that when you can measure what you are speaking about, and express it in numbers, you known something about it; but when you cannot measure it, when you cannot express it in numbers, your knowledge is of a meagre and unsatisfactory kind; it may be the beginning of knowledge, but you have a scarcely, in your thoughts, advanced to the stage of a science, whatever the matter may be."

In describing kaolins, as above mentioned, the terms "brightness" and "whiteness" are frequently used and these two qualities are often confused although they are not the same. For scientific measurement, the generally accepted definition of brightness is the reflectance of a sample kaolin at a wave-length of 457 millimicrons using magnesium oxide as a standard. Whiteness Index is defined as the numerical difference between the reflectances of a sample kaolin at 400 and 700 millimicrons respectively, the measurements usually being made on a Hardy spectrophotometer made by the General Electric Company. That substances of the same brightness can have different colors is shown by the graphs in FIG. 7. These spectrophotometric curves were made several years ago to show the reflectance characteristics of unbleached yellowish kaolin (Curve A), unbleached pink kaolin (Curve E) and various mixtures of these clays. Although the yellow and pink clays tested showed the same degree of brightness, there was a marked difference in whiteness, the Whiteness Index for the yellow clay being 26.6, the W.I. for the pink being 22.9. Accordingly, we might have a very "bright yellow" clay but it would not be very white. When laundering white clothes and bedding, the housewife usually adds bluing to the rinse water to make the laundered articles whiter. This results in articles which are whiter but less bright.

I claim:

1. A method of improving the whiteness of washed surfacially stained secondary kaolin to obtain a product having a whiteness index with the range of measured whiteness of imported English clays, 13.9–9.5, comprising the steps of (1) forming a slurry of said kaolin, (2) fractionating the kaolin to obtain a coarse particle fraction having not more than about 20% of fine particles smaller than 2 microns, e.s.d. therein, (3) subjecting said coarse particles fraction to a delaminating treatment by extrusion to remove at least one surface lamina from each of a major portion of said coarse particles to form a substantial number of new plate-like fine particles and to expose thereby a substantial number of new surfaces, and (4) fractionating the product to recover a fine particle fraction containing at least 80% of fine particles smaller than 2 microns e.s.d.

2. The method claimed in claim 1, plus the step of chemically bleaching said recovered fines fraction.

3. The method claimed in claim 1, the delaminating treatment consisting in adjusting the moisture content of the coarse particle fraction to a percentage low enough to require a pressure of at least 350 p.s.i. to force the mass through a 3/16" hole, and extruding the mass under a pressure of said magnitude.

4. The method claimed in claim 1, including continuously operating said delaminating treatment and recycling the coarse fraction from the second said fractionating step for repeated delamination treatment.

5. The method claimed in claim 4, in which the material undergoing the delamination treatment is removed for fractionation before the newly formed fines exceed 35% of the mass.

6. The method claimed in claim 4, the coarse fraction from the first fractionating step being supplied for delamination at a rate balancing the removal of fines from the second fractionating step, whereby operating conditions for the delamination step are maintained substantially constant.

References Cited

UNITED STATES PATENTS

| | | | |
|---|---|---|---|
| 3,058,671 | 10/1962 | Billue | 23—110 |
| 3,343,973 | 9/1967 | Billue | 23—110 X |
| 2,904,267 | 9/1959 | Lyons | 106—72 |
| 2,305,404 | 12/1942 | Brown | 23—110 X |
| 2,920,832 | 1/1960 | Duke | 23—110 X |
| 3,171,718 | 3/1965 | Gunn et al. | 23—110 |

OTHER REFERENCES

Mellor: "Comprehensive Treatise On Inorganic and Theoretical Chemistry," vol. 6, 1925, p. 476.

EDWARD J. MEROS, Primary Examiner

U.S. Cl. X.R.

106—72; 241—24